United States Patent Office 3,830,713
Patented Aug. 20, 1974

3,830,713
ELECTROLYTIC TREATMENT OF METAL SUR-
FACES TO ELECTRODEPOSIT ALUMINA
John Kempton Aiken, Warehorne, near Ashford; Clive
Larson, Chiswick and Graham Sanderson, High
Wycombe, England, assignors to National Research
Development Corporation, London, England
No Drawing. Filed Mar. 13, 1973, Ser. No. 340,820
Claims priority, application Great Britain Mar. 14, 1972,
11,853/72
Int. Cl. C01b 13/14
U.S. Cl. 204—96
17 Claims

ABSTRACT OF THE DISCLOSURE

A method for the anodic electrodeposition of an oxide or hydroxide of aluminium from a bath comprising an aluminate solution stabilised by at least one aliphatic monocarboxylic acid containing at least six carbon atoms and at least four substituent hydroxyl groups, or a salt, boroderivative or lactone thereof, said boroderivative being obtainable by reacting boric acid or a borate with said acid or salt. Sodium gluconate is a particularly useful stabiliser and electrodeposition may be conducted in the presence of a suitable colouring agent to produce a coloured deposit.

---

This invention relates to the treatment of surfaces of metals and alloys.

According to British Patent Specification No. 1,051,665 alumina or aluminium hydroxide or mixtures thereof can be applied to metal surfaces, in particular to iron surfaces, by making the article to be coated the anode in a bath containing an aluminate such as a solution of sodium aluminate, at a pH between 10.5 and 13.0, at a current density of between 2 and 6 amperes per square decimetre, during a very short period, i.e. 1–4 seconds.

We have found the procedure of the above mentioned prior patent to possess two serious disadvantages. First, the coatings produced are exceedingly thin and consequently have little protective value in themselves, serving merely as a base for finishing processes such as painting. Secondly, the described sodium aluminate solutions, although claimed to be stabilized against precipitation of alumina in the bulk of the solution by the addition of ethylenediamine tetra-acetic acid or tartaric acid, have been found by us to be in fact very unstable, and to begin to precipitate alumina shortly after make-up and whether or not they are operated. Once formed, the precipitate cannot be re-dissolved except by the addition of mineral acid and this alone renders the process of B.P. 1,051,665 unsuitable for industrial operation.

It has now been found that very satisfactory protective coatings of an aluminium oxide can be anodically deposited upon metals and alloys from an aqueous aluminate solution stabilized by certain additives.

Accordingly the present invention comprises a method for the anodic electrodeposition of an oxide or hydroxide of aluminium from a bath comprising an aluminate solution stabilized by at least one aliphatic monocarboxylic acid containing at least six carbon atoms and at least four substituent hydroxyl groups, or a salt, boroderivative or lactone thereof, said boroderivative being obtainable by reacting boric acid or a borate with said acid or salt.

Gluconic and glucoheptonic acid are particularly suitable acids. The salts and in particular the ammonium or alkali metal salts, e.g. of sodium are however generally employed in preference to the free acids.

Boroderivatives of the said acids or their alkali salts may be prepared by reacting boric acid or an alkali borate with a selected aliphatic monocarboxylic acid or its alkali-salt for example an acid having a hydroxyl group on each of two adjacent carbon atoms, preferably in molar proportions of 1:2, boric acid or borate:aliphatic monocarboxylic acid or alkali salt. For example, a two molar aqueous solution of sodium gluconate (436 g./l.) and a 1 molar aqueous solution of boric acid (61.8 g./l.) may be mixed and reacted by heating at 70–100° C. for 30 minutes to give the required derivative.

Suitable boroderivatives to be used in accordance with the present invention include those which are believed to contain one or more of the groups:

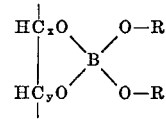

where $C_x$ and $C_y$ represent two carbon atoms in the chain of a polyhydroxycarboxylic acid and the radicals R represent two linked carbon atoms in a second chain of the polyhydroxycarboxylic acid or hydrogen or an alkali metal.

The solutions hereinbefore described, provided that they contain not less than 1% by weight of the stabilizer calculated upon the amount of sodium aluminate present, are found to have satisfactory storage and operational stability against spontaneous precipitation of alumina.

Certain complexing agents and in particular acids of the above-mentioned type have been widely stated to have an inhibitory effect upon the deposition of alumina in alkaline solutions used for the treatment of aluminium surfaces, their use for this purpose in etchants therefore being disclosed, for example in B.P. 731,035. It is a particularly surprising finding that such additives, whilst preventing alumina deposition in the bulk of an electrolyte, can actually promote its deposition upon an anodic surface in contact therewith. However, our observations have shown that many classes of complexants claimed to be useful additives to alkaline aluminium solutions for various purposes, e.g. EDTA and allied compounds, sugar alcohols, polybasic hydroxy-acids, and hydroxy-acids with fewer than five hydroxyl groups per molecule and six carbon atoms (e.g. those disclosed in U.S. Pats. 2,345,134 and 2,882,134 and B.P. 1,117,994), and including those specifically exemplified in B.P. 1,051,665, are relatively ineffective as stabilizers when used in the process of the present invention. The difficulty of predicting specific activity in this field is emphasised for example by the fact that gluconic acid, one of the most effective additives in the process of the present invention, is stated to be ineffective in the process of B.P. 1,117,994 (formation of a matte surface upon aluminium) in comparison with, for example, sorbitol which is ineffective in the process of our invention.

Furthermore, we have observed that careful control of the concentration of additive is of the utmost importance, too high a concentration of additive relative to that of aluminium inhibiting anodic deposition of alumina. In accordance with the present invention the concentration is such as to permit electrodeposition of alumina while inhibiting spontaneous precipitation in the bulk of solution. Suitable values for the concentration may be readily determined in particular cases by experiment.

It is, however, usually undesirable to exceed a molar ratio of 1:10 additive: aluminate and in practice molar ratios of less than 1:300 additive: aluminate are rarely used. When sodium gluconate for example is used as the sole additive and when the concentration of sodium aluminate lies within the preferred range 5 g./l. to 50 g./l. (0.061 to 0.61 molar), the concentration of sodium gluconate at the lower end of the range (ca. 5 g./l. aluminate) may be 0.05 g./l. to 2 g./l., though it is preferably 0.05 to 1 g./l. At the upper end of the aluminate concentration range (ca. 50 g./l.), the concentration of gluconate may be 0.5 to 20 g./l. though preferably 0.5 to 10 g./l.

Suitable operating conditions comprise a deposition time of at least 5 seconds at a current density at least 0.5 amp per sq. dm. and usually not greater than 6 amps/sq. dm. preferably 3 amps/sq. dm. or less, at a temperature of between 0° C. and 90° C. Operating pH is preferably neutral or alkaline (i.e. at least 7) and for most rapid deposition we have found it desirable to adjust the pH with mineral acid (for example hydrochloric acid or sulphuric acid) or suitable carboxylic acid (for example tartaric acid) to a value at which precipitation of hydrated aluminium oxide is incipient.

The process of the present invention is applicable to the coating of surfaces of metals such as iron, copper, zinc, aluminium, lead, tin, magnesium and iron, copper zinc, aluminium, lead, tin and magnesium based alloys. Such coatings are remarkably adherent to the metal or alloy substrate and can readily be dyed in the same way as coatings on anodised aluminium.

Since lead, tin, aluminium and zinc are soluble in alkaline solutions, it is surprising that a coating, particularly an adherent coating, of alumina and/or aluminium hydroxide is formed when those metals or alloys thereof are made the anode in the aqueous alkaline electrolyte.

At high concentrations of the aliphatic polyhydroxy monocarboxylic acid or derivative thereof, there may be some tendency to anodic attack upon substrates and consequent discolouration of the coating. This can, however, be inhibited by the addition to the bath of an appropriate, corrosion inhibitor. In the case of copper, zinc and iron, benzotriazole, rubeanic acid and phosphates such as trisodium orthophosphate or disodium hydrogen phosphate may respectively be used. In some cases e.g. copper, the metal surface may be pretreated with the inhibitor before immersion in the bath.

It is also known that coatings of alumina or aluminium hydroxide or mixtures thereof produced by anodising aluminium can be dyed to give a range of colours. The method of producing these coatings differs essentially from the electrodeposition process however in that the coating of the aluminium is formed by anodic oxidation of the aluminium anode and the coating is not electrodeposited from the solution.

It has now been found that coloured coatings can be produced in a one stage process by combining the coating step with a colouring step. Thus, metals or alloys such as those above mentioned may be made the anode in a stabilized solution of an aluminate as hereinbefore described which contains in solution a colouring agent. Electrolysis of this novel type of solution produces an attractive coloured, protective, adherent coating.

It has also been found, surprisingly, that a deposited coating, which does not contain pores of the type present in anodically grown oxides on aluminum, can be dyed by compounds of the type used on anodised aluminium.

It has thus been found that a coating may be dyed subsequently to its electrodeposition (two stage process) or may be dyed simultaneously with its electrodeposition (one stage process).

When hydrated aluminium oxide is anodically deposited in accordance with the present invention, a current density preferably between 0.5 ampere per square decimetre and 6 ampere per square decimetre is employed, for a duration of at least five seconds and preferably greater than 1 minute at a temperature preferably between 0° C. and 90° C. in order that the degree of coating (coloured or uncoloured) is sufficient to hide blemishes on the metal or alloy substrate.

The pH of these solution preferably lies between 10.5 and 13. A cathode of an insoluble material (e.g. stainless steel or platinum) is provided in the solution, a direct current is passed through the solution via the anode and cathode, until a coating of alumina and/or aluminium hydroxide has built up on the surface to the required thickness, and the coated surface is preferably rinsed in water.

In the two stage process, the coating formed as above and preferably rinsed is immersed in a colouring solution and if necessary sealed and/or lacquered in a manner similar to the technique employed in the coloring and sealing of anodised aluminium.

The coloured coating formed in the one stage process may if desired, be sealed and/or lacquered by techniques similar to those used for anodised coatings. The invention also includes within its scope articles having surfaces of said metals or alloys coated and dyed by the methods set out above,.

The invention is illustrated by the following examples:

Example 1 (Coat only)

A strip of copper sheet is coated anodically with a light yellow adherent film of thickness 58 mg./dm.$^2$ as follows:

| | |
|---|---|
| Sodium aluminate | 25 g./l. |
| Sodium gluconate | 1 g./l. |
| pH (adjusted with hydrochloric acid) | 11.2. |
| Current density | 0.5 amp/dm.$^2$. |
| Anode | Copper strip. |
| Cathode | Platinum gauze. |
| Temperature | 20° C. |
| Time | 3 minutes. |

Example 2 (Two stage coat-and-dye process)

A strip of copper sheet is coated as above, washed in distilled water and dyed an attractive yellow colour as follows:

(i) Immersed in aqueous load acetate solution 5 g./l., 20° C. for 1 minute with agitation.
(ii) Washed in tap water.
(iii) Immersed in aqueous potassium dichromate solution 5 g./l., 20° C. for 1 minute with agitation.
(iv) Washed in tap water.
(v) Cycle repeated a number of times until the required yellow colour is achieved.

Example 3 (One stage coat-and-dye process)

5 g./l. Aluminium Red GLW is added to a solution identical to that used in Example 1. A strip of copper sheet is coated with an attractive red, adherent deposit as follows:

| | |
|---|---|
| Current density | 1.0 amp/dm.$^2$ |
| Temperature | 70° C. |
| Time | 1 minute. |
| Agitation | Moderate solution. |

The test panel is washed in tap water, dried in acetone and lacquered.

Example 4 (Coat only)

A zinc alloy die casting (ILZRO 14) is coated an attractive light grey colour as follows:

| | |
|---|---|
| Sodium aluminate | 25 g./l. |
| Sodium gluconate | 1 g./l. |
| pH (adjusted by tartaric acid) | 11.2. |
| Current density | 1.0 amp/dm.$^2$ |
| Anode | ILZRO 14 rod. |
| Cathode | Platinum gauze. |
| Temperature | 20° C. |
| Time | 10 minutes. |

Example 5 (Coat-and-dye, 2 stage process)

The above example is repeated, the deposit washed in tap water, and the die-cast zinc specimen immersed in 10 g./l. Alizarin Red S dye aqueous solution at 70° C. for 15 minutes An attractive plum coloured coating is obtained.

Example 6 (Coat-and-dye, 1 stage process)

2 g./l. Aluminium Red GLW dye is added to a solution made up as in Example 4 and a red adherent deposit obtained on a strip of zinc sheet as follows:

| | |
|---|---|
| Current density | 1.0 amp/dm.$^2$ |
| Temperature | 70° C. |
| Time | 1 minute. |
| Agitation | Moderate solution. |

The test panel is washed in distilled water, then sealed in 2% nickel sulphate at 80° C. for 3 minutes followed by 20 minutes in boiling distilled water.

Example 7 (Coat only)

High quality aluminium sheet is coated with a white adherent deposit, 145 mg./dm.$^2$ thick, as follows:

| | |
|---|---|
| Sodium aluminate | 25 g./l. |
| Sodium gluconate | 1 g./l. |
| pH (adjusted by tartaric acid) | 12. |
| Current density | 0.5 amp/dm.$^2$. |
| Temperature | 20° C. |
| Time | 3 minutes. |

Example 8 (Two stage process, coat-and-dye)

An aluminium alloy die casting is coated as in Example 7, washed in distilled water and dyed orange as follows:

| | |
|---|---|
| Aluminium Orange RL | 5 g./l. |
| Temperature | 70° C. |
| Time | 1 minute. |

The coloured coating is washed in tap water, and sealed in boiling distilled water for 20 minutes.

Example 9 (One stage process, coat-and-dye)

High quality aluminium sheet is coated and dyed by the one stage process in the solution quoted in Example 7 with 10 g./l. Aluminium Red GLW added to it. The conditions of operation are as follows:

| | |
|---|---|
| Current density | 1.0 amp/dm.$^2$ |
| Temperature | 40° C. |
| Time | 5 minutes. |

The red coating is washed in distilled water, dried in acetone and lacquered.

Example 10 (One stage process, coat-and-dye)

A strip of rolled lead is coated with a red-brown deposit by the aforesaid one-satge process as follows:

| | |
|---|---|
| Sodium aluminate | 25 g./l. |
| Sodium gluconate | 1 g./l. |
| Aluminium Red GLW | 1 g./l. |
| pH (adjusted by tartaric acid) | 11.2. |
| Current density | 1.5 amps/dm.$^2$. |
| Anode | Lead strip. |
| Cathode | Platinum gauze. |
| Temperature | 20° C. |
| Time | 2 minutes. |
| Solution agitation | Moderate. |

Example 11 (Two stage process, coat-and-dye)

The two stage process is used to produce an indigo coloured coating on rolled lead strip as follows:

Stage 1

| | |
|---|---|
| Sodium aluminate | 25 g./l. |
| Sodium gluconate | 1 g./l. |
| pH (adjusted with tartaric acid) | 11.2. |
| Current density | 1.5 amps/dm.$^2$. |
| Anode | Lead strip. |
| Cathode | Platinum gauze. |
| Temperature | 20° C. |
| Time | 3 minutes. |

The resulting coated strip is washed in distilled water and dried, and then dyed an indigo colour in Stage 2.

Stage 2

| | |
|---|---|
| Nigrosine | 5 g./l. |
| Temperature | 70° C. |
| Immersion time | 10 minutes. |
| Solution agitation | Moderate. |

The dyed coating is sealed in boiling distilled water for twenty minutes.

Example 12 (Two stage process, coat-and-dye)

A sample of rolled tin sheet is given an electrodeposited coating using a solution of sodium aluminate and tartaric acid under the following conditions:

| | |
|---|---|
| Sodium aluminate | 25 g./l. |
| Sodium gluconate | 1 g./l. |
| pH (adjusted with tartaric acid) | 11.2. |
| Current density | 1.5 amps/dm.$^2$. |
| Anode | Tin sheet. |
| Cathode | Platinum gauze. |
| Temperature | 20° C. |
| Time | 10 minutes. |

The resulting coated sheet is washed in distilled water and dried, then dyed an attractive blue colour by immersing it alternately in a solution of ferric chloride (5 g./l.) and a solution of potassium ferrocyanide (5 g./l.).

The dyed coating is then sealed in boiling water for twenty minutes.

Example 13 (One stage process, coat-and-dye)

A sample of rolled tin sheet is coated with a red deposit under the following conditions:

| | |
|---|---|
| Sodium aluminate | 25 g./l. |
| Sodium gluconate | 1 g./l. |
| Aluminium red GLW | 1 g./l. |
| pH (adjusted with tartaric acid) | 11.2. |
| Current density | 1.5 amps/dm.$^2$. |
| Anode | Tin sheet. |
| Cathode | Platinum gauze. |
| Temperature | 20° C. |
| Time | 2 minutes. |
| Solution agitation | Moderate. |

Example 14 (One stage process, coat-and-dye)

Cold-rolled, nominally pure magnesium sheet is given a red coating by the aforesaid one-stage process as follows:

| | |
|---|---|
| Sodium aluminate | 25 g./l. |
| Sodium gluconate | 1 g./l. |
| Aluminium red GLW | 1 g./l. |
| pH (adjusted with tartaric acid) | 11.2. |
| Temperature | 20° C. |
| Anode | Magnesium sheet. |
| Cathode | Platinum gauze. |
| Current density | 1.5 amps/dm.$^2$. |
| Time of coating | 3 minutes. |

Moderate solution agitation.

The coloured coating is sealed in boiling water for 30 minutes.

Example 15 (Two stage process)

The two stage process is used to produce an orange coloured coating on cold-rolled, nominally pure magnesium sheet as follows:

Stage 1

| | |
|---|---|
| Sodium aluminate | 25 g./l. |
| Sodium gluconate | 1 g./l. |
| pH (adjusted with tartaric acid) | 11.2. |
| Temperature | 30° C. |
| Anode | Magnesium sheet. |
| Cathode | Platinum gauze. |
| Current density | 1.5 amps/dm.$^2$. |
| Time of coating | 3 minutes. |
| Agitation | Nil. |

The resulting coated sheet is washed in distilled water and dried, then dyed an orange colour in Stage 2.

Stage 2

| | |
|---|---|
| Aluminium Orange RL | 1 g./l. |
| pH | 9.4. |
| Temperature | 60° C. |
| Time of colouring | 10 minutes. |
| Moderate solution agitation. | |

The dyed coating is sealed in boiling distilled water for thirty minutes.

Example 16 (Coat-and-dye, one stage process)

A 70/30 brass panel is coated and dyed by the one stage process in the solution quoted in Example 9, with pH adjusted to 11.35 with tartaric acid and temperature held at 50° C. Current density and time are as quoted in Example 9.

The red deposit was washed in distilled water and sealed in 2% nickel sulphate solution at 80° C. for 20 minutes.

Example 17

A mild steel panel is coated and dyed by the two stage process in the following solution.

| | |
|---|---|
| Sodium aluminate | 25 g./l. |
| Sodium gluconate | 2 g./l. |
| pH | 11. |
| Temperature | 20° C. |
| Anode | Mild steel. |
| Cathode | Stainless steel. |
| Current density | 1.5 amps/dm.$^2$. |
| Time | 3 minutes. |

The resulting coating is dyed orange as in Stage 2 of Example 15.

Example 18

A steel substrate is coated with aluminium from an aluminate bath stabilized with sodium borogluconate under the following operating conditions:

| | |
|---|---|
| Sodium aluminate | 25 g./l. |
| Ratio of borogluconate to aluminate | 1:40 (by weight). |
| pH | 12.2. |
| Temperature | 20° C. |
| Time | 10 minutes. |
| Current density | 0.5 amps/dm.$^2$. |

A uniform compact deposit is produced with thickness 4.8.

Example 19

A steel substrate is coated with alumina from an aluminate bath stabilized with 1,5-gluconolactone under the following conditions:

| | |
|---|---|
| Sodium aluminate | 25 g./l. |
| Ratio of gluconolactone to aluminate | 1:40 (by weight). |
| pH | 12.2 |
| Temperature | 20° C. |
| Time | 10 minutes. |
| Current density | 0.5 amp/dm.$^2$. |

A uniform compact deposit is produced with thickness 4.8.

Example 20

A steel substrate is coated with alumina from an aluminate bath stabilized with 1,5-gluconolactone under the following conditions:

| | |
|---|---|
| Sodium aluminate | 25 g./l. |
| Ratio of gluconolactone to aluminate | 1:20. |
| pH | 11.2. |
| Temperature | 50° C. |
| Time | 10 minutes. |
| Current density | 0.5 amp/dm.$^2$. |

A uniform compact deposit is produced with thickness 5.2.

We claim:

1. In a method for the anodic electrodeposition of an oxide or hydroxide of aluminium which comprises passing an electric current through an aluminate solution between a cathode and said anode, the improvement wherein said solution is stabilized by at least one aliphatic monocarboxylic acid containing at least six carbon atoms and at least four substituent hydroxyl groups, or a salt, boroderivative or lactone thereof, said boroderivative obtained by reacting boric acid or a borate with said acid or salt.

2. A method according to Claim 1, in which the bath contains sodium gluconate as a stabilizer.

3. A method according to Claim 1, in which the bath contains sodium glucoheptonate as a stabilizer.

4. A method according to Claim 1, in which the bath contains 1,5-gluconolactone as a stabilizer.

5. A method according to Claim 1, in which the bath contains sodium borogluconate as a stabilizer.

6. A method according to Claim 1, in which the molar ratio of stabilizer to aluminate lies in the range of 1:10 to 1:300.

7. A method according to Claim 1, in which the bath contains an aqueous soltuion of sodium aluminate at a concentration in the range 5 to 50 g./litre.

8. A method according to Claim 1, in which the anode is of lead, tin, aluminium, zinc or an alloy thereof.

9. A method according to Claim 1, in which the bath additionally includes a colouring agent whereby a coloured anodic deposit is produced.

10. A method according to Claim 1, in which the current density during electrodeposition lies in the range 0.5 to 6 amps/dm.$^2$.

11. A method according to Claim 1, in which the pH of the bath lies in the range 10.5 to 13.

12. A method according to Claim 1, in which the period of electrodeposition exceeds one minute.

13. A method according to Claim 1, in which the temperature of the bath lies in the range 0° C. to 90° C.

14. A method according to Claim 1, in which the anode is of ferrous metal.

15. A method according to Claim 14, in which the anode is of stainless steel.

16. A method according to Claim 1, in which the anode is of copper, tin or mangnesium.

17. A method for the anodic electrodeposition of an oxide or hydroxide of aluminium comprising passing an electric current of at least 0.5 amp. per sq. dm. through an aluminate solution between a cathode and said anode at a temperature of the order of 0° C. to 90° C. in a bath having a pH of at least 7 comprising an aluminate solution and a stabilizer, the stabilizer being at least one aliphatic monocarboxylic acid containing at least 6 carbon atoms and at least four substituent hydroxyl groups, or a salt, boroderivative or lactone thereof, said boroderivative obtained by reacting boric acid or a borate with said acid or salt, the molar ratio of said stabilizer to aluminate is in the range of 1:10 to 1:300 and the electrodeposition time at least 5 seconds.

References Cited
UNITED STATES PATENTS

| | | | |
|---|---|---|---|
| 3,556,958 | 1/1971 | Hutchings et al. | 204—56 R |
| 2,911,341 | 11/1959 | Linden | 204—56 R |

JOHN H. MACK, Primary Examiner

R. L. ANDREWS, Assistant Examiner